United States Patent
Gilmore et al.

(10) Patent No.: US 8,294,296 B2
(45) Date of Patent: Oct. 23, 2012

(54) SYSTEM, METHOD, AND APPARATUS FOR REMOTELY COUPLING PHOTOVOLTAIC ARRAYS

(75) Inventors: Jack Arthur Gilmore, Fort Collins, CO (US); Eric Seymour, Fort Collins, CO (US)

(73) Assignee: Advanced Energy Industries, Inc., Fort Collins, CO (US)

( * ) Notice: Subject to any disclaimer, the term of this patent is extended or adjusted under 35 U.S.C. 154(b) by 516 days.

(21) Appl. No.: 12/507,019

(22) Filed: Jul. 21, 2009

(65) Prior Publication Data

US 2009/0283130 A1 Nov. 19, 2009

Related U.S. Application Data

(63) Continuation-in-part of application No. 12/184,535, filed on Aug. 1, 2008, now Pat. No. 8,203,069.

(51) Int. Cl.
*H02J 3/00* (2006.01)
(52) U.S. Cl. .......... 307/45; 136/243; 136/244; 136/261; 136/265
(58) Field of Classification Search .......... 307/45, 307/52, 77, 82; 136/243, 244, 290, 293, 136/261, 265
See application file for complete search history.

(56) References Cited

U.S. PATENT DOCUMENTS

| | | | |
|---|---|---|---|
| 3,986,097 A | 10/1976 | Woods | |
| 4,025,862 A | 5/1977 | Gautheron | |
| 4,054,827 A | 10/1977 | Reimers | |
| 4,080,646 A | 3/1978 | Dietrich | |
| 4,128,793 A | 12/1978 | Stich | |
| 4,161,023 A | 7/1979 | Goffeau | |
| 4,678,983 A | 7/1987 | Rouzies | |
| 4,748,311 A | 5/1988 | Thomas | |
| 4,768,096 A | 8/1988 | Cannella et al. | |
| 5,270,636 A | 12/1993 | Lafferty | |
| 5,451,962 A | 9/1995 | Steigerwald | |
| 5,781,419 A | 7/1998 | Kutkut et al. | |
| 5,923,100 A | 7/1999 | Lukens et al. | |
| 5,932,994 A | 8/1999 | Jo et al. | |
| 6,093,885 A * | 7/2000 | Takehara et al. | 136/244 |
| 6,115,273 A | 9/2000 | Geissler | |
| 6,266,260 B1 | 7/2001 | Zahrte, Sr. et al. | |
| 6,404,655 B1 | 6/2002 | Welches | |
| 6,625,046 B2 | 9/2003 | Geissler | |

(Continued)

FOREIGN PATENT DOCUMENTS

JP 05-025890 A 2/1993

(Continued)

OTHER PUBLICATIONS

Ha, Jeong Kyun, "PCT International Search Report re Application No. PCT/US09/054904", Aug. 23, 2010, Published in: PCT.

(Continued)

*Primary Examiner* — Jared Fureman
*Assistant Examiner* — Alfonso Perez Borroto
(74) *Attorney, Agent, or Firm* — Neugeboren O'Dowd PC

(57) ABSTRACT

System, methods and apparatus for coupling photovoltaic arrays are disclosed. The apparatus may include a first input adapted to couple to a neutral line of a first photovoltaic array; a second input adapted to couple to a neutral line of a second photovoltaic array; a contactor configured to switchably couple the neutral line of a first photovoltaic array to the a neutral line of a second photovoltaic array, the contactor being remotely controllable.

18 Claims, 12 Drawing Sheets

U.S. PATENT DOCUMENTS

| | | | |
|---|---|---|---|
| 6,812,396 | B2 | 11/2004 | Makita et al. |
| 6,844,739 | B2 | 1/2005 | Kasai et al. |
| 6,914,418 | B2 | 7/2005 | Sung |
| 7,053,506 | B2 | 5/2006 | Alonso et al. |
| 7,292,419 | B1 | 11/2007 | Nemir |
| 7,456,524 | B2 | 11/2008 | Nielsen et al. |
| 7,554,031 | B2 * | 6/2009 | Swanson et al. ............. 136/261 |
| 7,619,200 | B1 | 11/2009 | Seymour et al. |
| 7,701,081 | B2 | 4/2010 | Seymour |
| 7,768,751 | B2 | 8/2010 | Gilmore et al. |
| 2001/0004322 | A1 | 6/2001 | Kurokami et al. |
| 2001/0023703 | A1 * | 9/2001 | Kondo et al. ................. 136/244 |
| 2001/0048605 | A1 | 12/2001 | Kurokami et al. |
| 2002/0105765 | A1 | 8/2002 | Kondo et al. |
| 2003/0111103 | A1 | 6/2003 | Bower et al. |
| 2003/0155887 | A1 | 8/2003 | Bourilkov et al. |
| 2003/0172968 | A1 | 9/2003 | Armer et al. |
| 2004/0211459 | A1 | 10/2004 | Suenaga et al. |
| 2005/0139259 | A1 * | 6/2005 | Steigerwald et al. ......... 136/293 |
| 2005/0180181 | A1 | 8/2005 | Gaudreau et al. |
| 2005/0279402 | A1 | 12/2005 | Ahn et al. |
| 2006/0162772 | A1 * | 7/2006 | Presher et al. ................ 136/290 |
| 2006/0221653 | A1 | 10/2006 | Lai et al. |
| 2006/0227472 | A1 | 10/2006 | Taylor et al. |
| 2008/0291706 | A1 | 11/2008 | Seymour et al. |
| 2009/0032082 | A1 | 2/2009 | Gilmore et al. |
| 2009/0078304 | A1 | 3/2009 | Gilmore et al. |
| 2009/0167086 | A1 | 7/2009 | Seymour |
| 2009/0167097 | A1 | 7/2009 | Seymour et al. |
| 2009/0190275 | A1 | 7/2009 | Gilmore et al. |
| 2009/0217964 | A1 | 9/2009 | Gilmore et al. |
| 2009/0283130 | A1 | 11/2009 | Gilmore et al. |
| 2010/0132758 | A1 | 6/2010 | Gilmore |

FOREIGN PATENT DOCUMENTS

| | | |
|---|---|---|
| JP | 06-252434 A | 9/1994 |
| JP | 07-049721 A | 2/1995 |
| JP | 10-014111 A | 1/1998 |
| JP | 10-229679 A | 8/1998 |
| JP | 11-285260 A | 10/1999 |
| JP | 2000-295786 A | 10/2000 |
| JP | 2000-358370 A | 12/2000 |
| JP | 2002-319687 A | 10/2002 |
| JP | 2003-124492 A | 4/2003 |
| JP | 2004-015941 A | 1/2004 |
| JP | 2004-343909 A | 12/2004 |
| JP | 2005-204485 A | 7/2005 |
| JP | 2006-187150 A | 7/2006 |
| JP | 2007-201257 A | 8/2007 |
| KR | 10-2006-0100840 | 9/2006 |
| KR | 20-2006-0021132 | 10/2006 |
| WO | 2007022955 | 3/2007 |

OTHER PUBLICATIONS

Guinea, William, "PCT International Search Report re Application No. PCT/US09/065629", Feb. 12, 2010, Published in: PCT.

Sohn, Seung C., "Notice of Non-Compliant Amendment Office Action re U.S. Appl. No. 12/189,187", Aug. 12, 2009, p. 2, Published in: US.

Nguyen, Danny, "Office Action re U.S. Appl. No. 12/022,147", Jan. 22, 2010, p. 46, Published in: US.

Sohn, Seung C., "Office Action re U.S. Appl. No. 12/189,187", Apr. 3, 2009, p. 14, Published in: US.

Sohn, Seung C., "Office Action re U.S. Appl. No. 11/967,933", Oct. 4, 2010, p. 29, Published in: US.

Gardner, Shannon M., "Office Action re U.S. Appl. No. 12/184,535", Nov. 10, 2010, p. 7, Published in: US.

Moyse, Ellen, "International Preliminary Report on Patentability and Written Opinion re Application No. PCT/US08/072108", Feb. 18, 2010, Published in: PCT.

Nickitas-Etienne, Athina, "International Preliminary Report on Patentability and Written Opinion re Application No. PCT/US09/031549", Aug. 12, 2010, Published in: PCT.

Honda, Masashi, "International Preliminary Report on Patentability and Written Opinion re Application PCT/US09/051855", Feb. 24, 2011, Published in: PCT.

O'Dowd, Sean R., "Response to Oct. 4, 2010 Office Action re U.S. Appl. No. 11/967,933", Jan. 1, 2011, p. 6, Published in: US.

O'Dowd, Sean R., "Response to Jan. 22, 2010 Office Action re U.S. Appl. No. 12/022,147", Feb. 25, 2010, p. 28, Published in: US.

O'Dowd, Sean R., "Response to Nov. 10, 2011 Office Action re U.S. Appl. No. 12/184,535", Mar. 10, 2011, p. 14, Published in: US.

O'Dowd, Sean R., "Response to Apr. 3, 2009 Office Action re Patent Application U.S. Appl. No. 12/189,187", Jun. 29, 2009, p. 51, Published in: US.

O'Dowd, Sean R., "Response to Notice of Non-Compliant Amendment re U.S. Appl. No. 12/189,187", Aug. 13, 2009, p. 10, Published in: US.

IEEE, "Std. 519-1992", "IEEE Recommended Practices", Apr. 12, 1993, pp. 1-100, Publisher: IEEE.

Yao, Gang, et al., "Interleaved Three-Level Boost Converter with Zero Diode Reverse-Recovery Loss", "Applied Power Electronics Conference and Exposition", Sep. 1, 2004, pp. 1090-1095, vol. 2, Publisher: IEEE, Published in: US.

Zhang, Michael T., et al., "Single-Phase Three-Level Boost Power Factor Correction Converter", "Applied Power Electronic Conference and Exposition", Mar. 1, 1995, pp. 434-439, vol. 1, Publisher: IEEE, Published in: US.

Gow, J.A., et al., "Photovoltaic Converter System Suitable for Use in Small Scale Stand-Alone or Grid Connected Applications", "Proceedings Electric Power Applications", Nov. 1, 2000, pp. 535-543, vol. 147, No. 6, Publisher: IEEE, Published in: US.

Pinheiro, J.R., et al., "Dual Output Three-Level Boost Power Factor Correction Converter with Unbalanced Loads", "Power Electronics Specialists Conference", Jun. 1, 1996, pp. 733-739, vol. 1, Publisher: IEEE, Published in: US.

Kwon, Jung-Min, et al., "Photovoltaic Power Conditioning System with Line Connection", "Transaction on Industrial Electronics", Aug. 1, 2006, pp. 1048-1054, vol. 53, No. 4, Publisher: IEEE, Published in: US.

Enslin, Johan, et al., "Integrated Photovoltaic Maximum Power Point Tracking Converter", "Transactions on Industrial Electronics", Dec. 1, 1997, pp. 769-773, vol. 44, No. 6, Publisher: IEEE, Published in: US.

Walker, Geoffrey R., et al., "Cascaded DC-DC Converter Connection of Photovoltaic Modules", "Transactions on Power Electronics", Jul. 1, 2004, pp. 1130-1139, vol. 19, No. 4, Publisher: IEEE, Published in: US.

Kim, Jung-Han, et al., "A Study on the Harmonic Elimination used Passive Filter and Active Filter", "KIIEE", 2001, pp. 77-83, Publisher: KIIEE, Published in: KR.

Ahmed, K.H., et al., "Passive Filter Design for Three-Phase Inverter Interfacing in Distributed Generation", "Electrical Power Quality and Utilization Journal", 2007, Page(s) abstract, Fig. 1 19, vol. 13, No. 2, Published in: US.

Park, Jae Hun, "PCT International Search Report re Application No. PCT/US08/072108", Feb. 24, 2009, Published in: PCT.

Giffo-Schmitt, Beate, "PCT International Preliminary Report on Patentability re PCT/US08/077724", May 27, 2010, Published in: PCT.

Koh, Jae Hyun, "PCT International Search Report re Application No. PCT/US08/077734", Apr. 29, 2009, Published in: PCT.

Bae, Jin Yong, "PCT International Search Report re Application No. PCT/US08/086931", Jun. 25, 2009, Published in: PCT.

Bae, Jin Yong, "PCT International Search Report re Application No. PCT/US08/087078", Jul. 9, 2009, Published in: PCT.

Han, Sang Il, "PCT International Search Report re Application No. PCT/US09/031549", Aug. 17, 2009, Published in: PCT.

Ha, Jeong Kyun, "PCT International Search Report re Application No. PCT/US09/051855", Mar. 22, 2010, Published in: PCT.

Wang, T.C., et al., "Output Filter Design for a Grid-Interconnected Three-Phase Inverter", "IEEE", 2003, pp. 779-784, Publisher: IEEE, Published in: US.

Woo Hyuk Lee, "A Study on the Design of Optimum Filter in Switching Amplifier", "Masters Thesis", Jan. 1, 1989, Publisher: Hanyang University, Published in: Republic of Korea.

Nguyen, Danny, "Office Action re U.S. Appl. No. 12/830,380", Jun. 3, 2011, p. 28, Published in: US.

Gardner, Shannon M., "Office Action re U.S. Appl. No. 12/184,535", Jun. 17, 2011, p. 9, Published in: US.

Bernier, Lindsey A., "Office Action re U.S. Appl. No. 12/326,209", Jun. 28, 2011, p. 7, Published in: US.

Athina Nickitas-Etienne, "International Preliminary Report on Patentability re Application No. PCT/US09/65629", Jun. 16, 2011, Published in: CH.

Sean R. O'Dowd, "Response to Jun. 28, 2011 Office Action re U.S. Appl. No. 12/326,209", Jul. 28, 2011, Published in: US.

Kolev, Vesselin, "International Search Report and Written Opinion re Application PCT/US11/023081", Apr. 27, 2011, p. 12, Published in: AU.

Gilmore, Jack Arthur, "Pending U.S. Appl. No. 12/830,380 'Energy Conversion System with Fault Detection and Interruption'", Jul. 5, 2010, Published in: US.

Choi, Nam Ho, "PCT International Search Report re Application No. PCT/US08/064263", Oct. 31, 2008, Published in: PCT.

Baharlou, Simin, "International Preliminary Report on Patentability re Application No. PCT/US09/054904", Jan. 24, 2012, p. 6, Published in: CH.

* cited by examiner

SYSTEM, METHOD, AND APPARATUS FOR REMOTELY COUPLING PHOTOVOLTAIC ARRAYS

PRIORITY

The present application is a continuation-in-part of U.S. application Ser. No. 12/184,535, filed Aug. 1, 2008, entitled System, Method, and Apparatus for Coupling Photovoltaic Arrays, which is a continuation-in-part of U.S. application Ser. No. 12/022,147, filed Jan. 29, 2008 entitled System and Method for Ground Fault Detection and Interruption and claims priority to provisional patent application No. 60/953,875, filed Aug. 3, 2007, entitled: High Power Photovoltaic System and Method, both of which are incorporated by reference herein in their entirety.

FIELD OF THE INVENTION

This invention relates generally to apparatus and methods for converting solar energy to electrical energy, and more specifically to apparatus and methods for coupling photovoltaic arrays with energy conversion and/or energy distribution equipment.

BACKGROUND OF THE INVENTION

Renewable energy is capturing an increasing amount of attention. And among renewable energy sources, the use of solar energy for generating electricity is now a viable option for many electrical energy needs, and solar energy will become more and more viable relative to other applications. In the context of electrical generation systems (e.g., photovoltaic systems greater than 100 kW), the performance, reliability and regulatory aspects of three-phase grid-tie photovoltaic (PV) inverters and the arrays to which they are connected are issues that will continue to garner attention.

Development of this class of equipment for the North American market over recent years has resulted in a set of commonly encountered characteristics. These attributes, while acquired through experience and adversity, have led to the present-day condition where the dominant indices of performance, particularly energy efficiency, have plateaued, and as a consequence, new solutions and approaches are needed to provide performance improvement.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

In one embodiment, the invention may be characterized as a photovoltaic energy conversion system that includes a power conversion component configured to electrically coupled to both, the positive rail of each of a plurality of first photovoltaic arrays and the negative rail of each of each of a plurality of the second photovoltaic arrays, the power conversion component is adapted to convert a voltage between the positive rails of the first photovoltaic arrays and the negative rails of the second photovoltaic arrays from one form to another form. The system in this embodiment also includes a plurality of photovoltaic ties, each of the plurality of photovoltaic ties is configured to couple and decouple one of the plurality of first photovoltaic arrays and a corresponding one of the plurality of the second photovoltaic arrays so as to form a plurality of decouplable bipolar arrays.

In accordance with another embodiment, the invention may be characterized as a method for controlling a photovoltaic array, the method including coupling a neutral line of a first photovoltaic array to a neutral line of a second photovoltaic array so as to place the first photovoltaic array above ground potential and the second photovoltaic array below ground potential; converting, remote from a location of the first and second photovoltaic arrays, power from the first and second arrays from one form to another form; and wirelessly controlling the coupling of the neutral line of the first photovoltaic array to the neutral line of the second photovoltaic array.

In accordance with yet another embodiment, the invention may be characterized as an apparatus for coupling photovoltaic arrays that includes a first input adapted to couple to a neutral line of a first photovoltaic array; a second input adapted to couple to a neutral line of a second photovoltaic array; a contactor configured to switchably couple the neutral line of the first photovoltaic array to the neutral line of the second photovoltaic array; a wireless module adapted to receive the control signal from a controller; a power component adapted to provide power to the contactor so that, responsive to the control signal, the contactor uses the power to switchably couple the neutral line of the first photovoltaic array to a neutral line of the second photovoltaic array.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
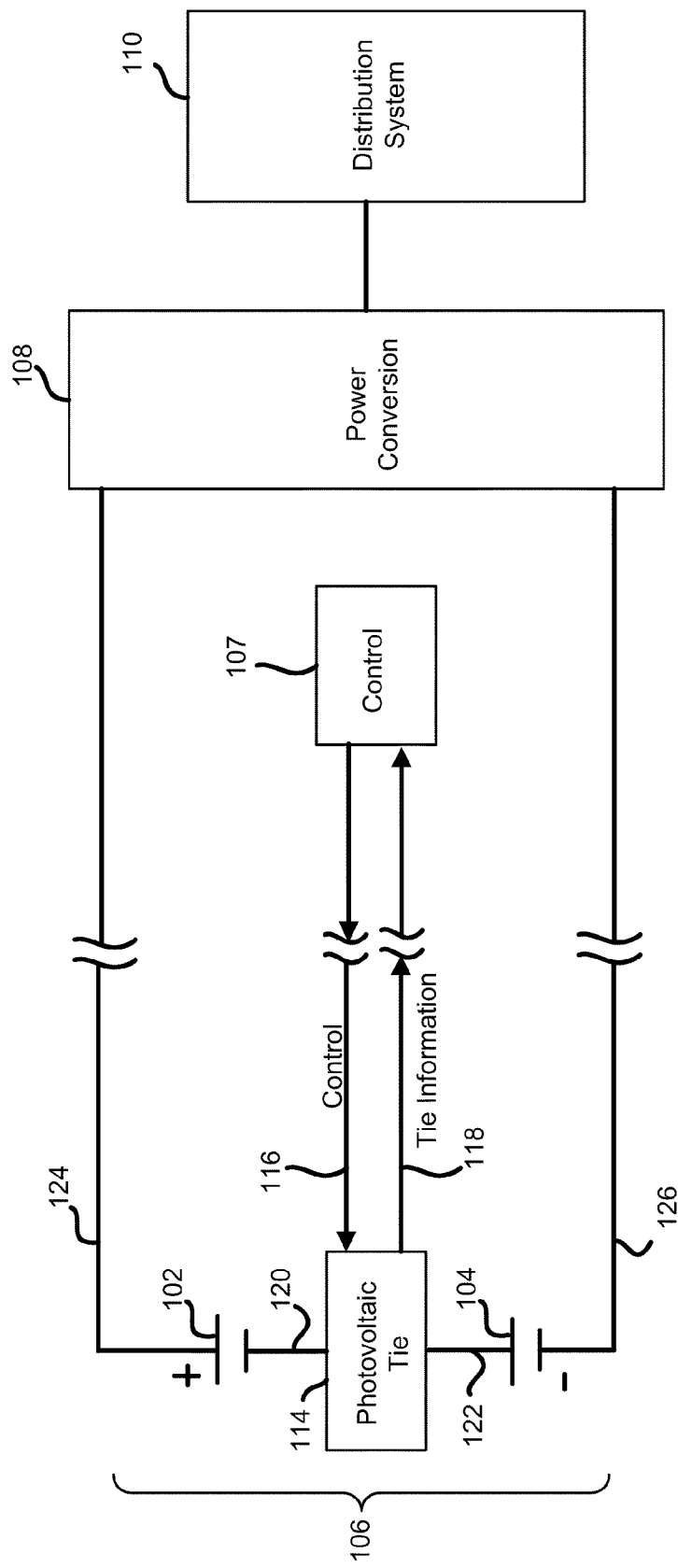
FIG. 1 is a block diagram depicting an exemplary embodiment of a photovoltaic energy conversion system.

Referring first to FIG. 1, shown is a block diagram of an exemplary embodiment of the present invention. As shown, in this embodiment a first set 102 and a second set 104 of photovoltaic arrays are coupled together by a photovoltaic tie 114 to create a bipolar panel array 106 that is remotely coupled to a power conversion component 108, which is disposed between the panel array 106 and a distribution system 110. Also depicted is a photovoltaic tie 114 that is disposed between the a first set 102 and a second set 104 of photovoltaic arrays and is remotely coupled to a control portion 107 by control lines 116 and tie-information lines 118.

The illustrated arrangement of the components depicted in FIG. 1 is logical and not meant to be an actual hardware diagram; thus, additional components can be added or combined with the components that are depicted in an actual implementation. It should also be recognized that the components, in light of the disclosure herein, may be readily implemented by one of ordinary skill in the art.

As an example, the control portion 107 is depicted as a separate functional component from the power conversion component 108, but the control portion 107 may be realized by components housed within the power conversion component 108 or distributed among the power conversion component 108 and the photovoltaic tie 114. Moreover, the power conversion component 108 is depicted as coupling directly to the array 106, but this is certainly not required. In some embodiments, for example, a PV interface is interposed between the array 106 and the power conversion component 108. In these embodiments, the PV interface generally operates to enable the power conversion component 108, which may designed to operate at lower voltages than the open-load, rail-to-rail voltage of the array 106, to be utilized in connection with the PV array 106 that operates at least a portion of the time (e.g., while unloaded) at a voltage that exceeds the designed operating voltage of the power conversion component 108. U.S. application Ser. No. 11/967,933, entitled Photovoltaic Inverter Interface Device, System and Method, which is incorporated herein by reference, discloses exemplary PV interfaces that may be utilized in connection with one or more embodiments of the present invention.

In general, the photovoltaic array 106 converts solar energy to DC electrical power, which may be converted to another form of power (e.g., three-phase AC power or higher-voltage DC power) by the power conversion component 108. As shown, the power that is output by the power conversion component 108 is applied to the distribution system 110, which in many embodiments is the three phase distribution system of a demand-side energy consumer (e.g., a commercial entity, industrial entity, or collection of residential units). In other embodiments, however, it is contemplated that the distribution system 110 is on or more portions of a utility distribution system.

In some embodiments, the cells in the array 106 include crystalline (e.g., monocrystalline or polycrystalline) silicon that operates in an open load state at 1200 Volts and operates in a loaded state between 660 and 960 Volts. And in other embodiments the array includes cells comprising amorphous silicon that operates in an open load state at 1400 Volts and a loaded state around 900 Volts. One of ordinary skill in the art will appreciate, however, that the photovoltaic array 106 may include a variety of different type photovoltaic cells that are disposed in a variety of different configurations. For example, the photovoltaic cells may be arranged in parallel, in series or a combination thereof.

Under traditional ground referencing of either the positive or negative rail of a mono-polar array, to comply with low-voltage regulations (e.g., U.S. National Electric Code (NEC)), the voltage of the mono-polar array is limited to 600 VDC. And given the substantial increase in cost to employ medium-voltage equipment, mono-polar arrays are limited in operational performance.

In the present embodiment, however, the center of the arrays 102, 104 are tied together in a "bi-polar" configuration, which enables the overall PV voltage to double before violating NEC low-voltage limits. Aside from efficiency gains from operating at a higher voltage, a direct conversion (e.g., without a transformer) into 480 VAC is possible; thus eliminating the ratio-changing function of the transformer. U.S. application Ser. No. 12/122,950 entitled COMMON MODE FILTER SYSTEM AND METHOD FOR A SOLAR POWER INVERTER, which is incorporated herein by reference provides additional details that may be utilized in connection with realizing a bipolar array, and for coupling one or more bi-polar arrays to a distribution system without a transformer.

In many embodiments, the array 106 provides 1200 VDC maximum differential open-load voltages that do not exceed the 600 VDC-to-ground NEC limits. While processing power, PV array 106 ground referencing may be derived from a star-point ground on the AC distribution system through the switching action of the power conversion component 108 (e.g., inverter).

In general, the power conversion component 108 converts power that is applied by the array 106 from one form to another form. In some embodiments, the power conversion component 108 includes an inverter to convert DC power provided by the array to AC power. In other embodiments, the power conversion component 108 includes DC to DC power conversion components, which may be used to convert the power from the array 106 to a higher or lower voltage.

The distribution system 110 generally operates to distribute power from the array 106 and power conversion component 108 to the premises where the array 106 and power conversion component 108 is located and/or to a utility distribution system. In many embodiments the distribution system 110 includes an AC distribution system and associated AC components such as transformers. In other embodiments, however, it is contemplated that the distribution system 110 may include DC distribution components to distribute DC power to remote locations.

One of the most challenging issues for solar PV system designers is placement of the power conversion component 108. Although it is often desirable to place the power conversion equipment 108 (e.g., an inverter) adjacent to the solar array 106, this placement is often not physically possible and/or cost efficient. And the greater the distance between the array 106 and the power conversion equipment 108, the more cost is incurred due to wiring cost and the greater the DC cable losses.

In the present embodiment, the photovoltaic tie 114 connects the neutrals 120, 122 of the arrays 102, 104 without returning the neutrals 120, 122 to the power conversion component 108 (e.g., inverter). In many implementations the positive 124 and negative 126 rails of the array 106 are contained in conduit and are coupled to power conversion component 108 by conductors capable of carrying high levels (e.g., 500 Amps) of current, but a third, high-gauge neutral run between the photovoltaic tie and the power conversion component 108 is unnecessary in the present embodiment. Instead, the control 116 and tie-information 118 lines are coupled to the control portion 107 by low gauge (e.g., 16 AWG) wire and the neutrals 120, 122 may be uncoupled from the power conversion component 108 while the array 106 is applying power to the power conversion component 108. As a consequence, the neutral DC home runs, and the long-length and large diameter wires of the neutral home-run legs, not to mention the conduit and installation labor, which can amount to tens of thousands of dollars, are eliminated. As compared to a bi-polar array that is tied together remotely from the array (e.g., adjacent to or within the power conversion component 108), the distance of DC transmission current may be reduced two fold.

Thus, installation of the photovoltaic tie 114 between the arrays 102, 104 enables DC wiring losses to potentially be cut in half, and the power conversion component 108 (e.g., inverter) may be positioned near the entrance of the utility feed to the facility to reduce AC losses. The result is either higher total system efficiency or the opportunity to use fewer panels in the system installation for the same energy harvest.

Figure 2:
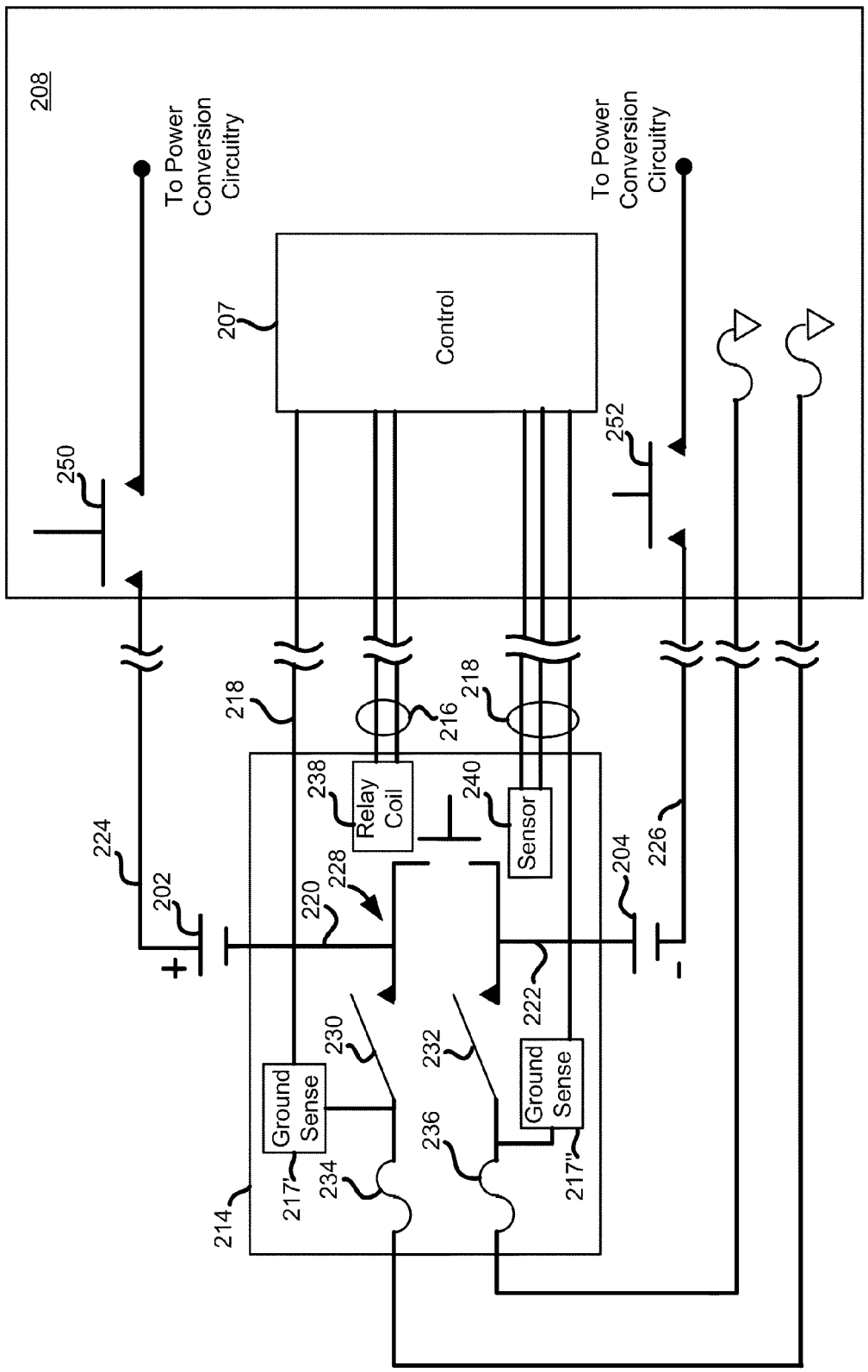
FIG. 2 is another block diagram depicting another exemplary embodiment of a photovoltaic energy conversion system.

Referring next to FIG. 2, it is a schematic view of a portion of an exemplary embodiment of the photovoltaic energy conversion system depicted in FIG. 1. As shown, a first and second arrays 202, 204 are coupled to a photovoltaic tie 214, and the photovoltaic tie 214 is coupled remotely by control lines 216 and tie-information lines 218 to a control portion 207, which in this embodiment, is housed within a power conversion component 208. In addition, a positive rail 224 of the first array 202 and a negative rail 226 of the second array 204 are switchably coupled to the energy conversion component 208.

As shown, in this embodiment a main contactor 228 is configured to couple and decouple respective neutrals 220, 222 of the first and second arrays 202, 204, and auxiliary switches 230, 232 of the photovoltaic tie 214, are configured to couple and decouple the respective neutrals 220, 222 of the first and second arrays 202, 204 to/from ground at the power conversion component 208. In particular, while the arrays 202, 204 are providing power to the power conversion component 208, the main contactor 228 is closed so as to couple the neutrals 220, 222 together and the auxiliary switches 230, 232 are opened so as to decouple the neutrals 220, 222 of the arrays 202, 204 from the power conversion component 208. In this state of operation, the neutrals 220, 222 are at or near ground potential, which may also be referred to as a "virtual ground," and there are only two conductors that apply power to the power conversion component 208: the positive rail 224 of the first array 202 and the negative rail 226 of the second array; thus expensive, high gauge neutral runs between the arrays 202, 204 and the power conversion component are eliminated.

And when the arrays 202, 204 are not providing power to the power conversion component 208 (e.g., at night), the main contactor 228 is open so as to decouple the neutrals 220, 222 of the arrays 202, 204 and the auxiliary switches 230, 232 are closed so as to couple the neutrals 220, 222 to ground via low gauge conductors (e.g., less than 5 Amps). Also shown in this embodiment are ground sense components 217', 217" that are configured to provide an indication of the status of the fuses 234, 236 (e.g., an indication as to whether the fuses are intact). As shown, the tie-information 218 in this embodiment includes the fuse-status information from the ground sense components 217', 217" that are coupled to the control portion 207 by wire line connection, but in other embodiments, wireless communications are utilized.

In many embodiments, the main switch 228 and auxiliary switches 230, 232 are integrated within a single relay device so as to enable the control portion 207 to simultaneously close the main contactor 228 while opening the auxiliary switches 230, 232 and vice versa. More specifically, the control portion 207 energizes a relay coil 238 and a sensor 240 provides a feedback signal via the tie-information lines 218 to the control portion 207 to provide status information about the state of the main contactor 228 and auxiliary switches 230, 232.

During a fault condition, DC contactors 250, 252 may be opened first to remove the virtual ground imposed on the arrays 202, 204, and once the contactors 250, 252 are opened, the main contactor 228 may be opened so as to isolate the positive and negative arrays 202, 204. Finally, the neutrals 220, 222 of the arrays 202, 204 are connected to ground with switches 230, 232. If the ground current is still present, the appropriate fuse 234, 236 will open; thus interrupting the ground current and preventing hazardous currents from flowing. Although the ground connections (that are coupled to the fuses 234, 236) are shown within the power conversion component 208, this is certainly not required, and in other embodiments ground connections may be outside the power conversion component 208 and in close proximity to the photovoltaic tie 214.

U.S. application Ser. No. 12/022,147, entitled System and Method for Ground Fault Detection and Interruption, which is incorporated herein by reference, discloses, among other technical advancements that may be utilized in connection with embodiments of the present invention, a novel structure and method to decouple components of a bipolar photovoltaic array once a ground fault condition requiring system interruption is detected.

Figure 3:
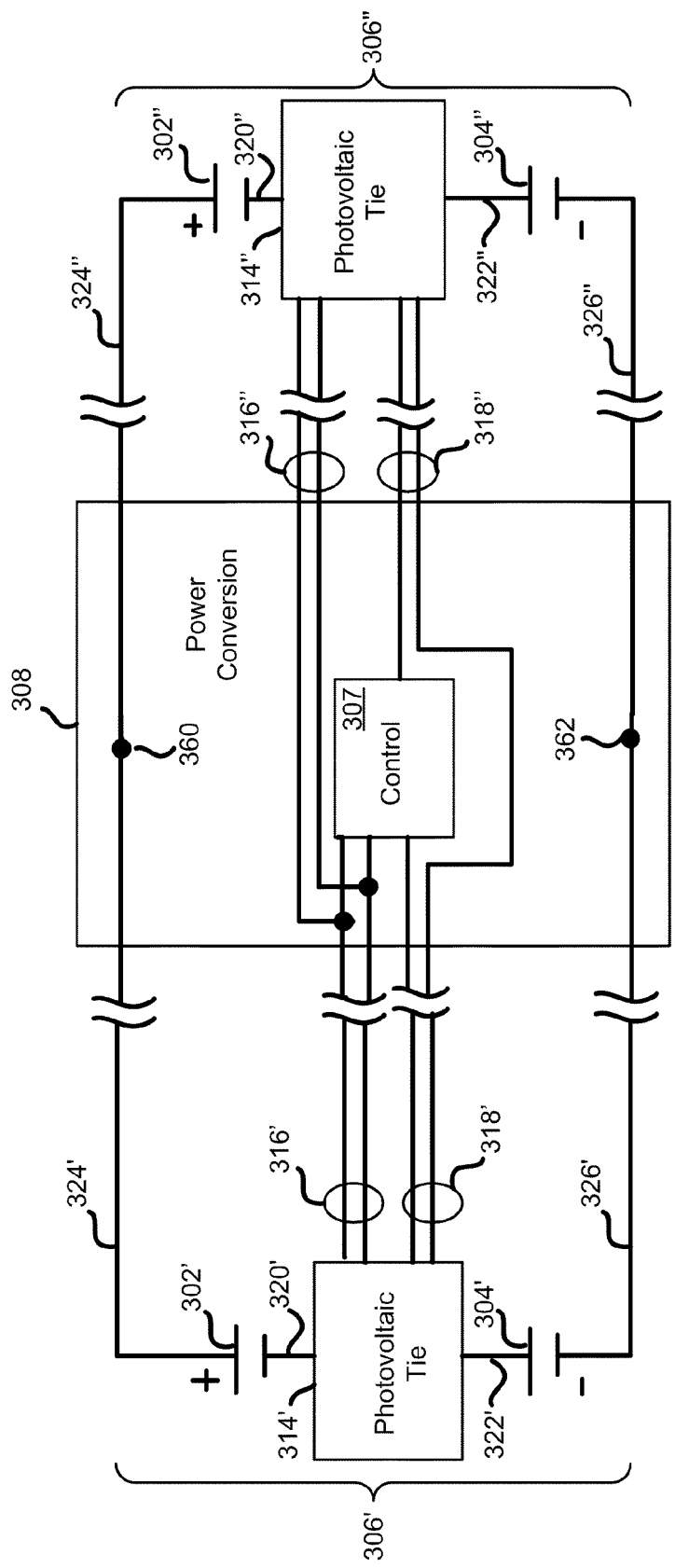
FIG. 3 is a block diagram depicting yet another exemplary embodiment of a photovoltaic energy conversion system.

Referring next to FIG. 3, shown is a block diagram of yet another embodiment of the present invention. As shown, in this embodiment two separate bipolar arrays 306', 306" are disposed in parallel so that the positive rails 324', 324" of each of the arrays 306', 306" are coupled together in the power conversion component 308 and the negative rails of each 326', 326" of each of the arrays 306', 306" are remotely coupled to a power conversion component 308. As depicted, power conversion circuitry (not shown) such as switching components of a DC to DC converter or inverter may couple to nodes 360, 362, which couple to the respective positive 324', 324" and negative 326', 326" rails of the arrays 306', 306".

In this embodiment, each of the two arrays 306', 306" may be remotely located relative to the other array and both arrays 306', 306" may be remotely located from the power conversion component 308. And while each of the two arrays 306', 306" is applying power to the power conversion portion 308, only four conductors are utilized for carrying current that is produced by the arrays 306', 306" to the power conversion component 308. As a consequence, an enormous amount of money may be saved because the high-gauge neutral lines that are ordinarily present between the arrays and the power conversion components have been eliminated.

As depicted, in this embodiment control lines 316', 316", which are utilized for controlling the switching (e.g., switching to couple the first pair 302', 304' of arrays together and the second pair 302", 304" of arrays together) of the photovoltaic ties 314', 314" are arranged in parallel and are coupled to a control portion 307, and tie-information lines 318', 318" are arranged in series so that if either of the photovoltaic ties 314', 314" fails to operate (e.g., fails to couple either the first pair 302', 304' of arrays together or the second pair 302", 304" of arrays together), then the control portion 307 does not receive feedback indicating the arrays are online and the control portion 307 will prevent the power conversion component 308 from operating.

Figure 4:
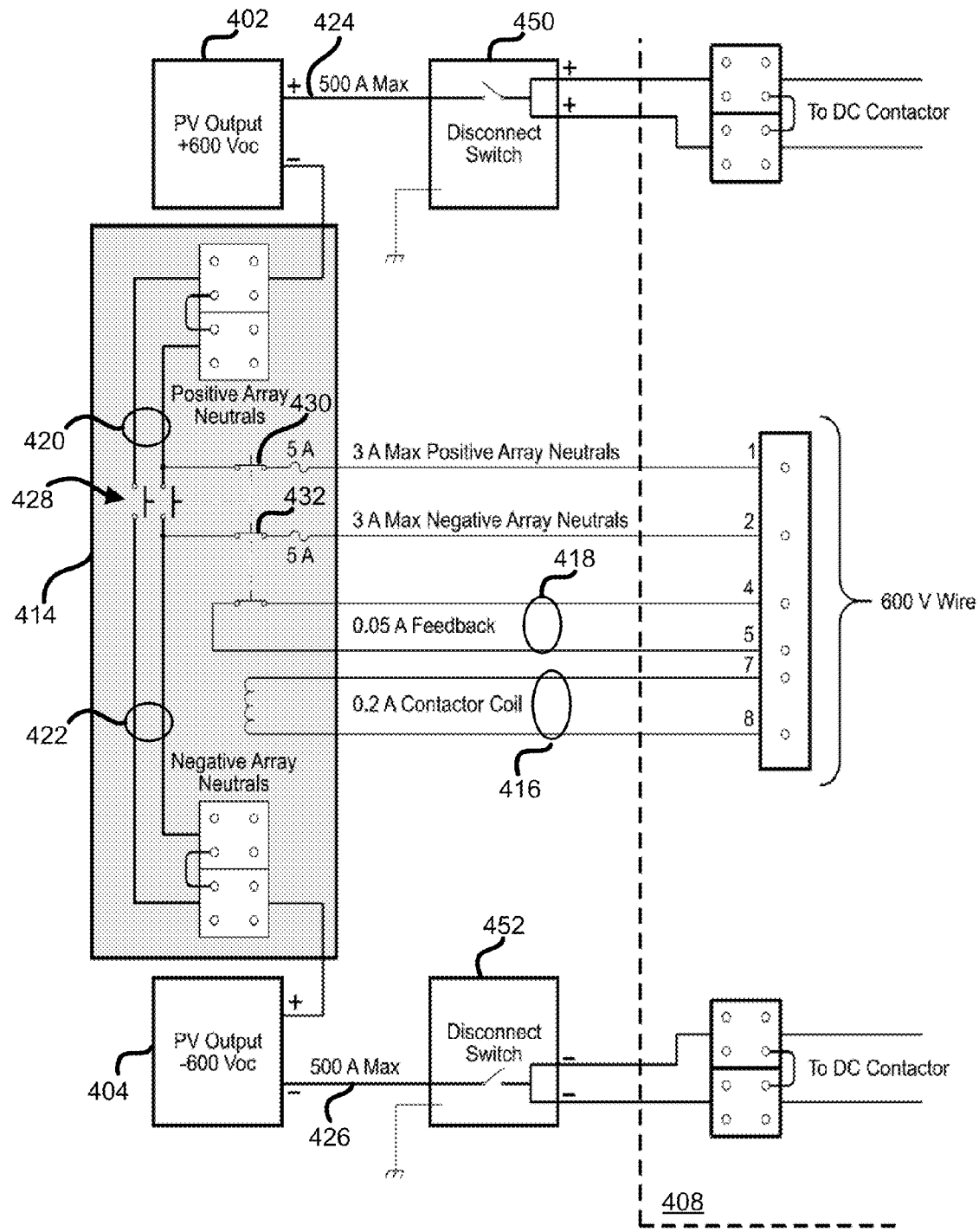
FIG. 4 is a block diagram depicting a particular embodiment of a photovoltaic energy conversion system.

Referring next to FIG. 4, it is a schematic view of a portion of another exemplary embodiment of the photovoltaic energy conversion system depicted in FIG. 1. As shown, a first and second arrays 402, 404 are coupled to a photovoltaic tie 414, and the photovoltaic tie 414 is coupled remotely by control lines 416 and tie-information lines 418 to a power conversion component 408. In addition, a positive rail 424 of the first array 402 and a negative rail 426 of the second array 404 are coupled by disconnect switches 450, 452 to the energy conversion component 408.

As shown, in this embodiment a main contactor 428 is configured to couple and decouple respective neutrals 420, 422 of the first and second arrays 402, 404, and auxiliary switches 430, 432 of the photovoltaic tie 414, are configured to couple and decouple the respective neutrals 420, 422 of the first and second arrays 402, 404 to/from a ground contact at the power conversion component 408. In particular, while the arrays 402, 404 are providing power to the power conversion component 408, the main contactor 428 is closed so as to couple the neutrals 420, 422 together and the auxiliary switches 430, 432 are open so as to decouple the neutrals 420, 422 of the arrays 402, 404 from the power conversion component 408. In this state of operation, the neutrals 420, 422 are at or near ground potential, and there are only two conductors that apply power to the power conversion component 408: the positive rail 424 of the first array 402 and the negative rail 426 of the second array 404; thus expensive neutral runs between the arrays 402, 404 and the power conversion component are eliminated.

Figure 5:
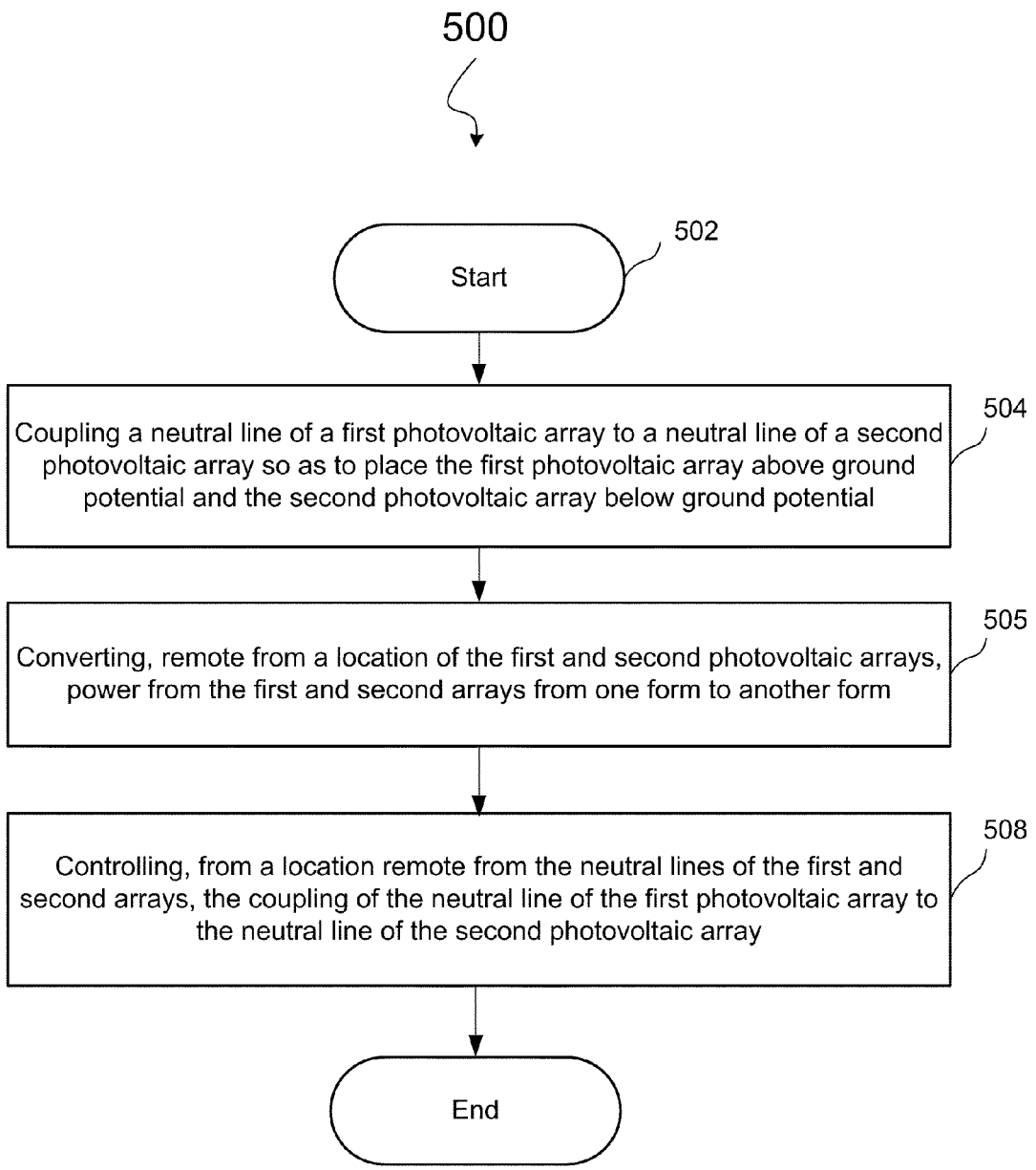
FIG. 5 is a flowchart depicting a method that may be carried out in connection with the embodiments discussed with reference to FIGS. 1-4.

Referring next to FIG. 5, it is a flowchart depicting an exemplary method that may be carried out in connection with the embodiments depicted in FIGS. 1-4. As shown, a neutral line (e.g., neutral line 120, 220, 320', 320", 420) of a first photovoltaic array (e.g., array 102, 202, 302', 302", 402) is coupled (e.g., by photovoltaic tie 114, 214, 314', 314", 414) to a neutral line (e.g., neutral line 122, 222, 322', 322", 422) of a second photovoltaic array (e.g., array 104, 204, 304', 304", 404) so as to place the first photovoltaic array above ground potential and the second photovoltaic array below ground potential (Blocks 502, 504). As discussed, by coupling neutrals of arrays (e.g., to keep the neutrals at virtual ground), the need to install expensive, heavy gauge neutral wires from the arrays, which are typically located on a roof or another remote location, to an electrical service panel (that is typically in close proximity to where power conversion and distribution equipment is located) is avoided.

As depicted in FIG. 5, power from the first and second arrays is then converted (e.g., by power conversion component 108, 208, 308, 408), remote from a location of the first and second photovoltaic arrays, from one form to another form (Block 505). As discussed, in some embodiments DC power from the arrays is converted to DC power at a higher voltage, and in many embodiments, the DC power from the arrays is converted to AC power.

In several embodiments, control (e.g., carried out by control portions 107, 207, 307) of the coupling of the neutral line of the first photovoltaic array to the neutral line of the second photovoltaic array is carried out, at least in part, from a location remote from the neutral lines of the first and second arrays (Block 508).

Figure 6:
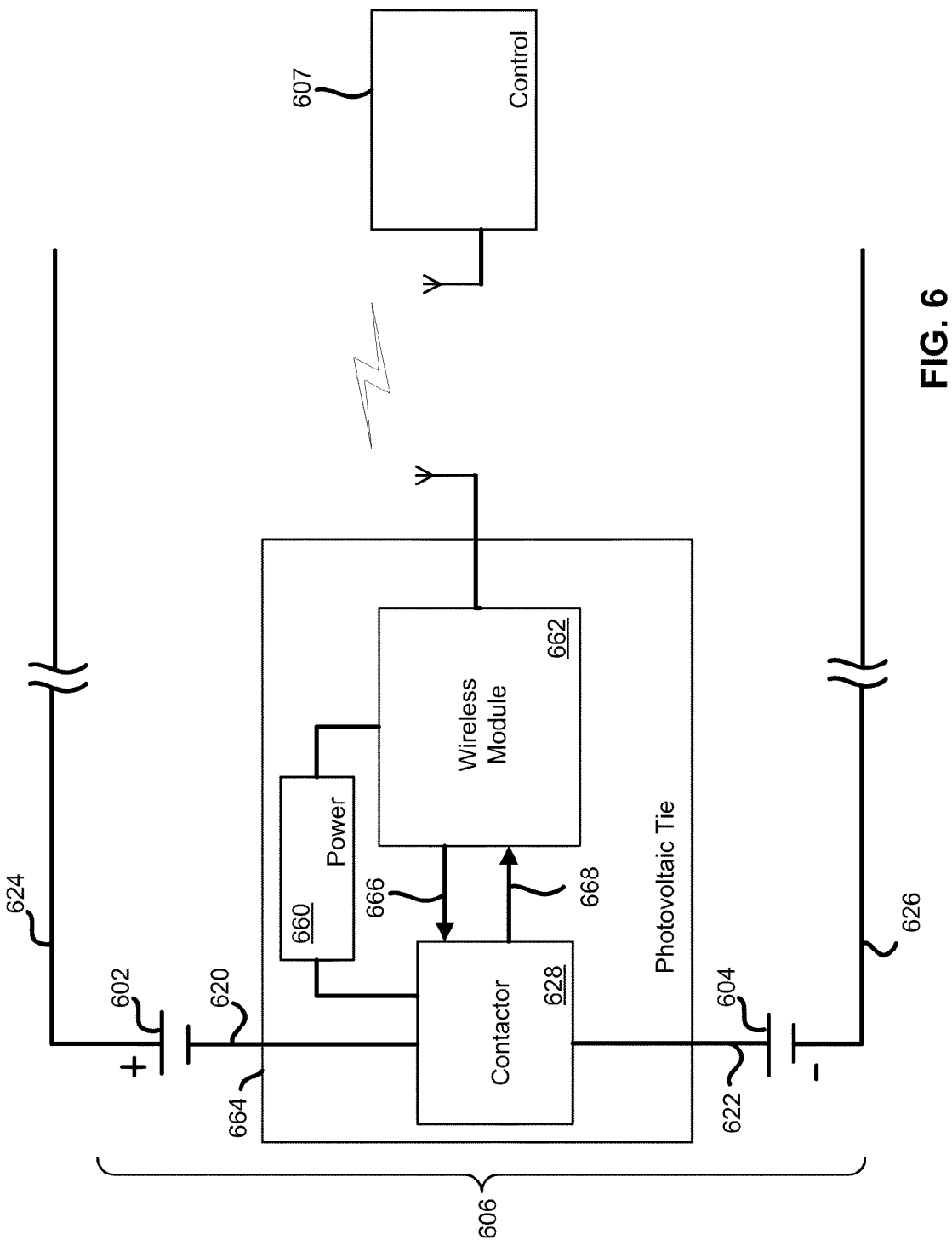
FIG. 6 is a block diagram depicting exemplary components of a wireless photovoltaic tie.

Referring next to FIG. 6, shown is a block diagram depicting exemplary components of a wireless photovoltaic tie 664. As shown, in this embodiment, the photovoltaic tie 664 is wirelessly coupled to control portion 607. More specifically, the photovoltaic tie 664 includes a wireless module 662 that is coupled to both a contactor 628 and a power component 660. As depicted, the wireless module 662 is configured to provide control information 666, received from a wireless signal (sent from the controller 607), and the wireless module 662 is configured to transmit tie information 668 that the wireless module 662 receives from the contactor 628 to the controller.

In general, the power component 660 provides power to the contactor 628 and the wireless module 662. In some embodiments, the power component 660 is configured to receive power from the photovoltaic array 606 and convert the power from the array 606 to provide power that may be utilized by the contactor 628 and the wireless module 662. In other embodiments, the power component 660 includes batteries that are used to apply power to the contactor 628 and wireless module 662. And in yet other embodiments, the power component 660 is configured to apply power to the contactor 628 and wireless module 662 that is received from another power source (e.g., utility power source).

Figure 7:
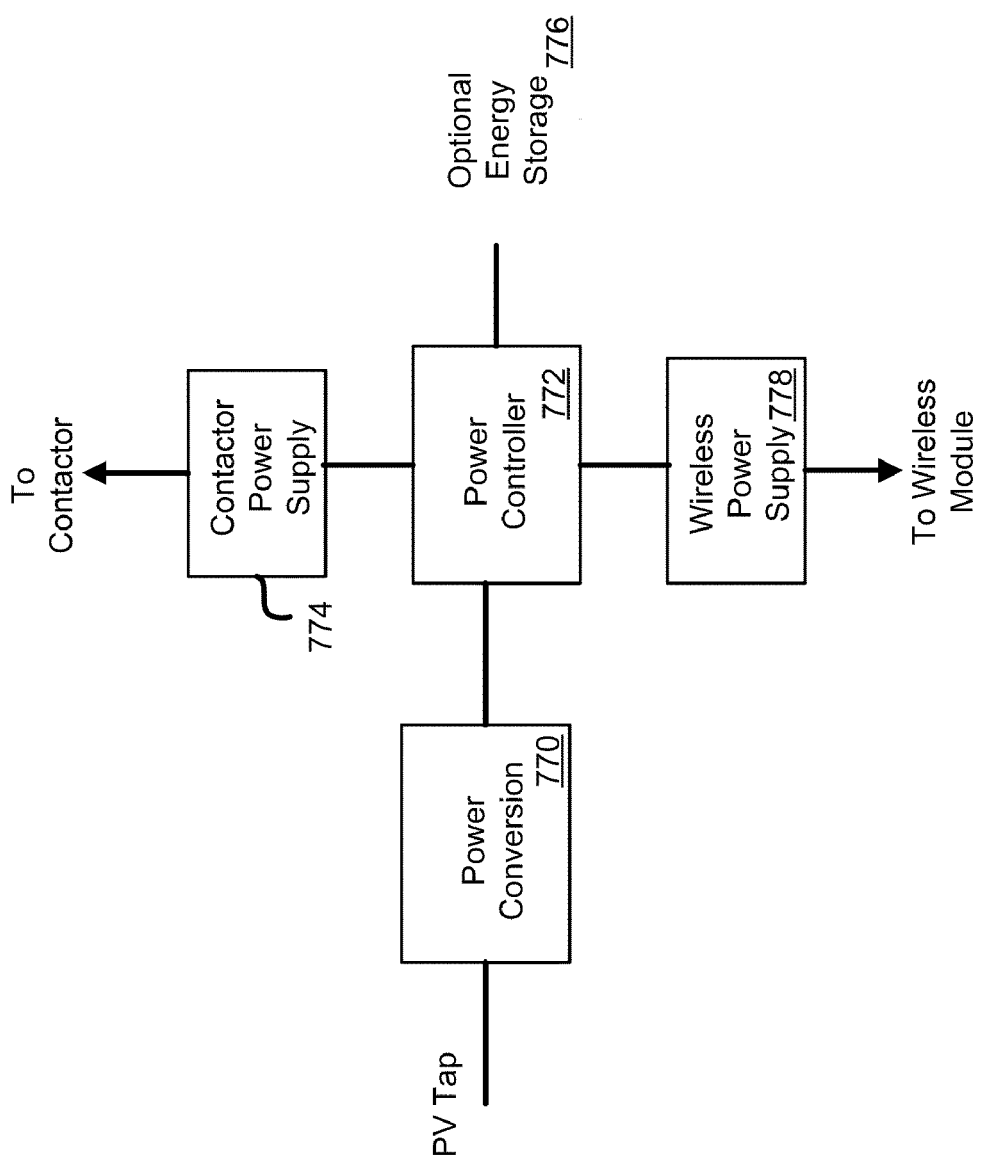
FIG. 7 is a block diagram depicting an exemplary embodiment of the power component described with reference to FIG. 6.

Referring briefly to FIG. 7, shown is an exemplary embodiment of the power component 660 described with reference to FIG. 6. As shown, in this embodiment the power component includes a power conversion component 770 that is coupled between a PV tap (e.g., a portion of the PV array 606) and a power controller 772. In addition, a contactor power supply 774 is coupled between a contactor (e.g., the contactor 628) and the power controller 772. The power controller 772 is also shown coupled to an optional energy storage component 776 and to a wireless power supply 778 that is coupled to a wireless module (e.g., the wireless module 662). The illustrated arrangement of the components depicted in FIG. 7 is logical and not meant to be an actual hardware diagram; thus, the functions carried out by the depicted components can be combined or further separated in an actual implementation. For example, the power controller 772 may be distributed among multiple components depicted in FIG. 7. It should also be recognized that the components, in light of the disclosure herein, may be readily implemented by one of ordinary skill in the art.

In general, the power conversion component 770 is configured to convert power from a PV array so that the power may be used by the contactor power supply 774 and the wireless power supply 778 to operate the contactor and wireless module, respectively. The power conversion component 770 may include, for example, a switch mode power supply to down-convert the PV voltage to a lower DC voltage (e.g., 24 VDC). The power controller 772 operates to manage the application of power from the power conversion component 770 to the contactor power supply 774, the wireless power supply 778, and optionally, the energy storage component 776 (e.g., rechargeable batteries). In some implementations, the power controller 772 may include control logic to control the application of power to the contactor power supply 774 and the wireless power supply 778. In one embodiment that includes the energy storage component 776, the power controller 772 may include charging circuitry to control the charging and discharge of the energy storage component 776.

Referring back to FIG. 6, the contactor 628 is generally configured to couple and decouple the negative rail 620 of the first array 602 and the positive rail 622 of the second array 604, which are also referred to as neutrals. In some embodiments, the contactor 628 includes the same or similar components as the contactor 228 described with reference to FIG. 2. For example, the contactor may include a relay coil (e.g., relay coil 238), which is powered by the power component and, responsive to the control signal 666, the relay coil opens and closes the contacts to couple/decouple the arrays 602, 604. In addition, the tie information 668 may include an indication of the status of the contactor (e.g., an indication as to whether the contactor is open or closed) and may include the fuse-status information from the ground sense components 217', 217".

The wireless module 662 generally operates to wirelessly receive control information from the control portion 607, which is then provided to the contactor 628, and transmit the tie information 668, which is received from the contactor 628. One of ordinary skill in the art will appreciate that the wireless module 662 may be realized by a variety of technologies including RF and optical technologies, which may utilize a variety of encryption, encoding, and modulation technologies. In some embodiments, the PV ties and control component 607 may all be addressable and/or networked together in a local area network (e.g., 802.11x network).

Figure 8:
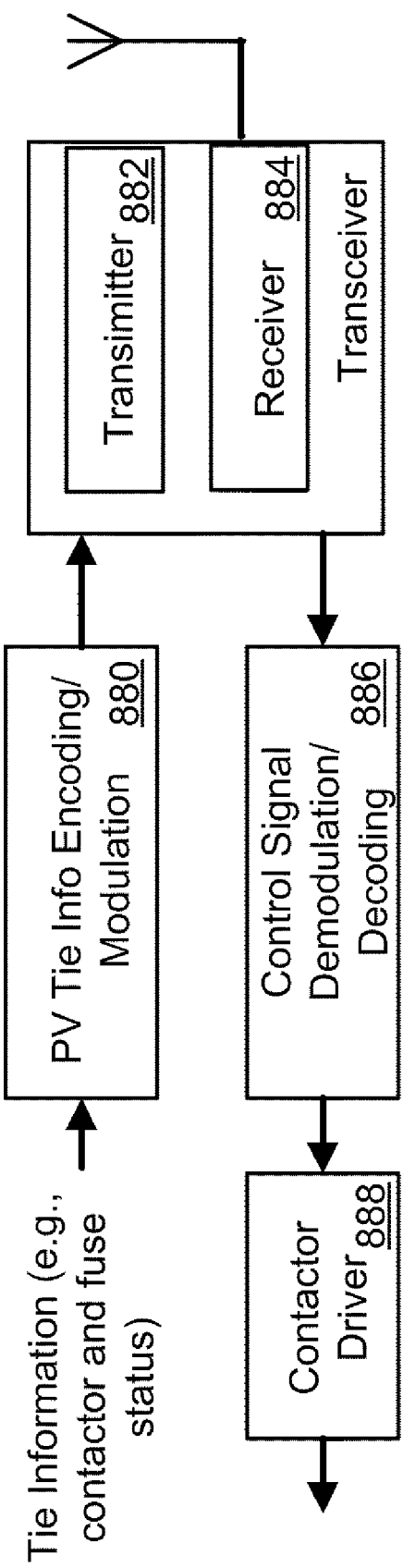
FIG. 8 is a block diagram depicting an exemplary embodiment of the wireless module depicted in FIG. 6.

Referring next to FIG. 8, shown is a block diagram depicting an exemplary embodiment of the wireless module depicted in FIG. 6. The wireless module includes a transmitter chain includes an encoding/modulation component 880 and a transmitter component 882, and a receiver chain that includes a receiver portion 884, a demodulation/decoding component 886, and a contactor driver 888. It should be recognized that that the illustrated arrangement of components is logical, and for clarity, does not depict many components that are readily available from a variety of commercial sources and familiar to one of ordinary skill in the art.

The encoding/modulation component 880 is generally configured to receive tie information (e.g., contactor status and fuse status information), encode the tie information (e.g., into a digital format or other form that is amenable to modulation), modulate the encoded tie information and provide the encoded and modulated tie information to the transmitter 882 for transmission to the control component (e.g., control component 607). In addition, in some embodiments, the encoding/modulation component 880 encodes identifying information that identifies the transmitting PV tie so that the control component 607 will be able to identify the particular PV tie that is sending status information.

The receiver 884 generally operates to receive control signals from the control component, and the demodulator/decoding component 886 demodulates and decodes the received control signals. As depicted, the demodulated and decoded control signals are provided to the contactor driver component 888, which applies or withdraws power from a contactor (e.g., contactor 628) responsive to signals to close and open the contactor, respectively.

Figure 9:
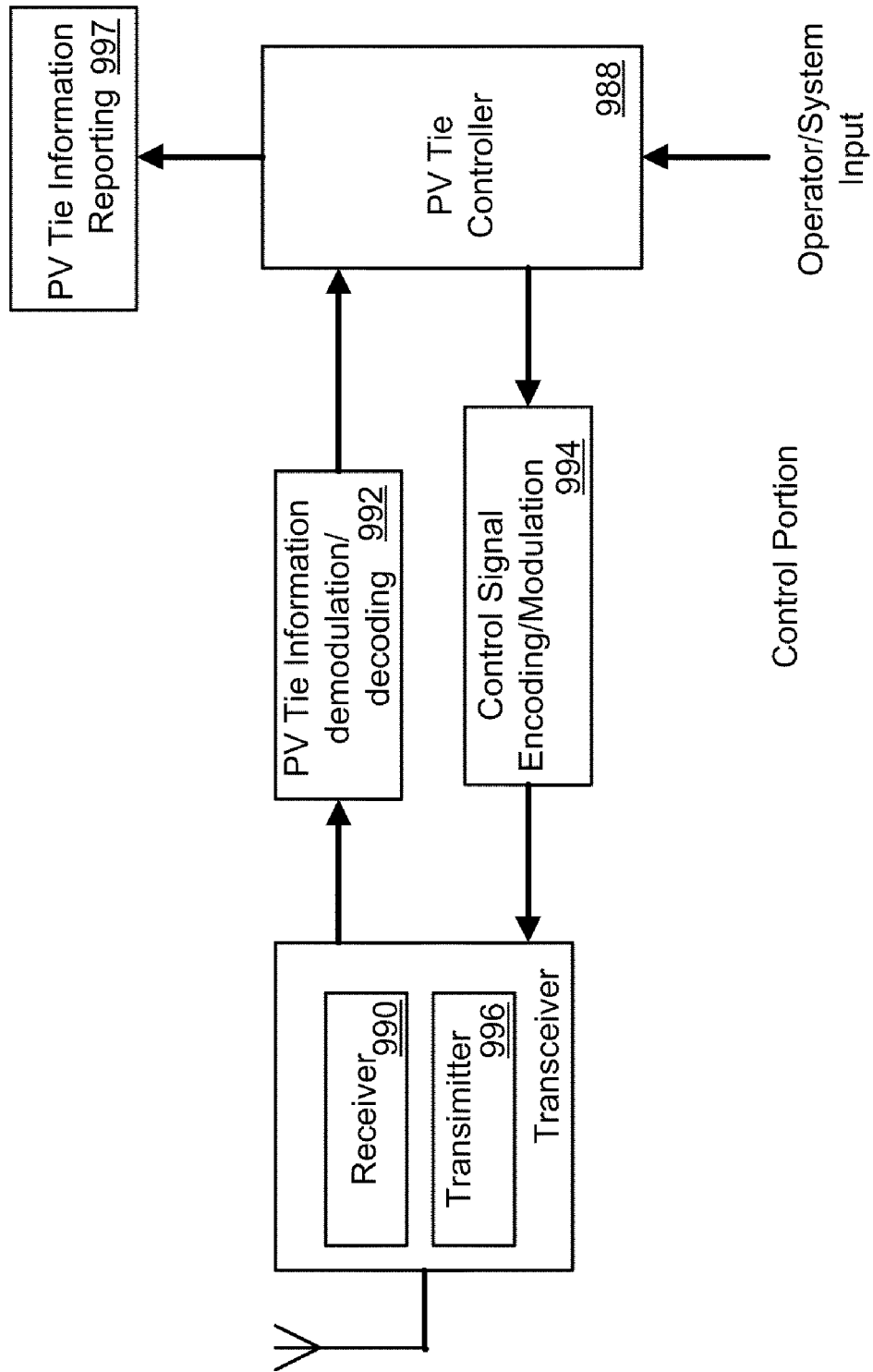
FIG. 9 is a block diagram depicting an exemplary embodiment of the control portion depicted in FIG. 6.

Referring next to FIG. 9, it is a block diagram depicting an exemplary embodiment of the control portion 607 depicted in FIG. 6. As shown, the control portion in this embodiment includes a PV tie controller 988 that is coupled to a receiver chain that includes a receiver 990 and a demodulator/decoder component 992, and the PV tie controller 988 is coupled to a transmitter chain that includes an encoding/modulation component 994 and a transmitter 996. In addition, a reporting component (e.g., a user display) 997 is coupled to the PV tie controller 988.

The PV tie controller 988 may be realized by hardware, software, firmware or a combination thereof (e.g. a general purpose computer may be adapted with software), and the PV controller is generally configured to control the operation of one or multiple PV ties. As shown, the PV tie controller 988 includes an operator or system input to enable either manual or system control of PV ties, and the reporting component 997 operates to provide feedback (e.g., PV tie contactor status and/or fuse status) to an operator.

As depicted, the PV tie controller 988 generates control signals that are encoded and modulated by the encoding/modulation component 994 and transmitted by the transmitter 996 to the PV ties (e.g., PV tie 664). One of ordinary skill in the art will appreciate that there are many techniques that may be employed to enable distinguishable communications to multiple PV ties. In some embodiments, for example, multiple frequencies (e.g., a separate carrier frequency for each PV tie), and in other embodiments, communications to each PV tie may be specifically encoded (e.g., by the encoding/modulation component 994) so only the intended PV tie may decode (e.g., using the demodulation/decoding component 886) the control signal. In addition, it is contemplated that security encryption may be utilized to prevent unauthorized control of the PV ties.

The receiver 990 in this embodiment receives tie information (e.g., contactor and fuse status information) from each of the PV ties, and the demodulation/decoding component 992 demodulates and decodes the received information so that both information identifying the PV tie and the tie information may be processed by the PV tie controller 988 and reported.

Figure 10:
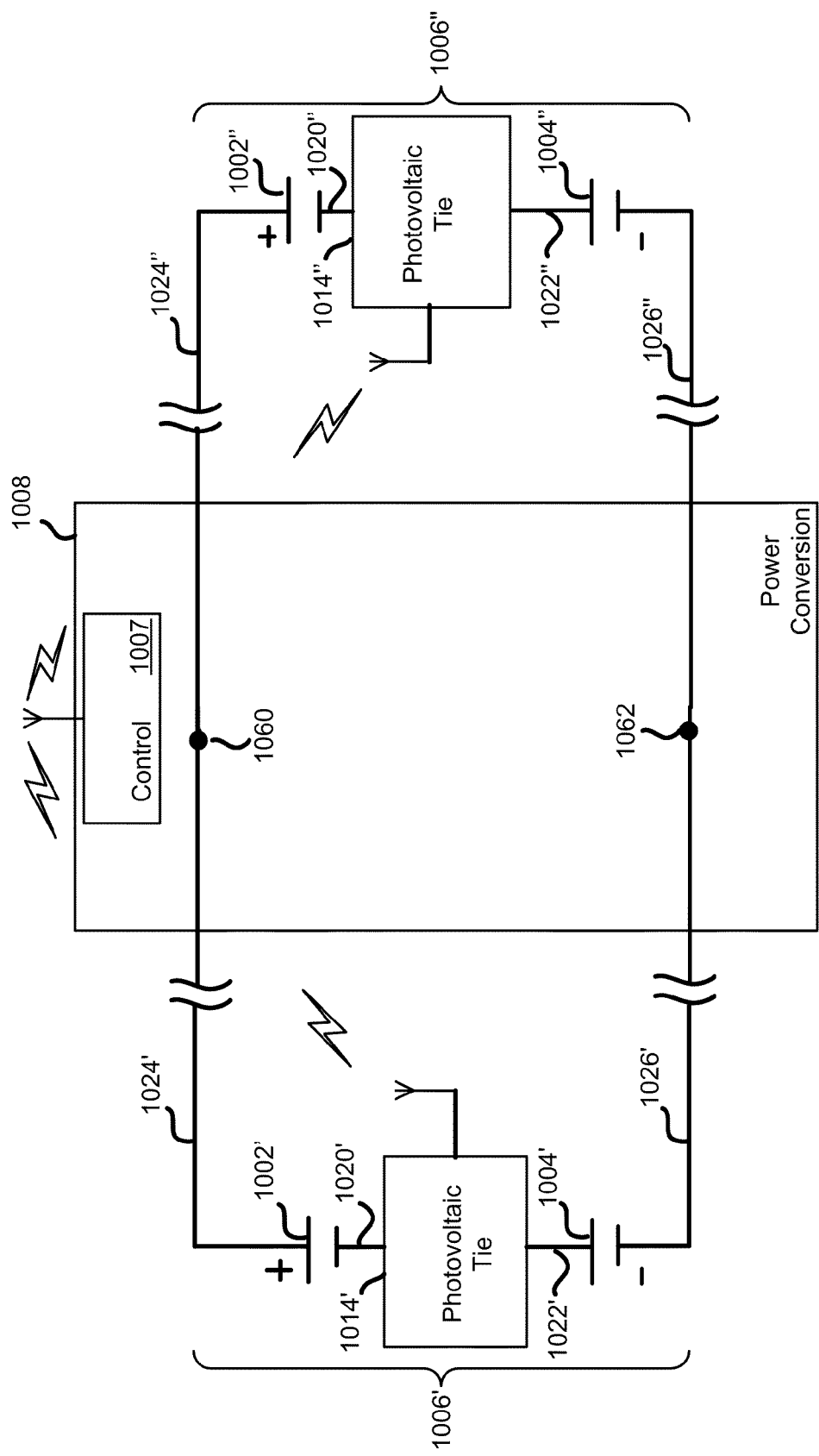
FIG. 10 depicts a photovoltaic system that includes a plurality of photovoltaic ties.

Referring next to FIG. 10, shown is a photovoltaic system that includes a plurality of photovoltaic ties 1014. As shown, in this embodiment two separate bipolar arrays 1006', 1006" are disposed in parallel so that the positive rails 1024', 1024" of each of the arrays 1006', 1006" are coupled together in the power conversion component 1008 and the negative rails of each 1026', 1026" of each of the arrays 1006', 1006" are remotely coupled to a power conversion component 1008. As depicted, power conversion circuitry (not shown) such as switching components of a DC to DC converter or inverter may couple to nodes 1060, 1062, which couple to the respective positive 1024', 1024" and negative 1026', 1026" rails of the arrays 1006', 1006".

In this embodiment, each of the two arrays 1006', 1006" may be remotely located relative to the other array and both arrays 1006', 1006" may be remotely located from the power conversion component 1008. And while each of the two arrays 1006', 1006" is applying power to the power conversion portion 1008, only four conductors are utilized for carrying current that is produced by the arrays 1006', 1006" to the power conversion component 1008. As a consequence, an enormous amount of money may be saved because the high-gauge neutral lines that are ordinarily present between the arrays and the power conversion components have been eliminated.

As depicted, in this embodiment the PV ties 1014 and the control portion 1007 are in wireless communication; thus control lines 316', 316" described with reference to the embodiment depicted in FIG. 3 are eliminated to render deployment of multiple remote PV ties 1014 easier and less expensive. As depicted, control signals are wirelessly transmitted to the PV ties 1014, which are utilized for controlling the switching (e.g., switching to couple the first pair 1002', 1004' of arrays together and the second pair 1002", 1004" of arrays together) of the photovoltaic ties 1014', 1014." As shown, the PV ties 1014 are arranged in parallel, and are also configured to wirelessly communicate tie information (e.g., contactor information and/or fuse information) to the control portion 1007. For example, if the control portion 1007 does not receive feedback indicating the arrays 1006 are online and the control portion 1007 will prevent the power conversion component 1008 from operating.

It should be recognized that, for clarity, that only two bipolar arrays 1006', 1006" are shown coupled to the power conversion component 1008, but one of ordinary skill in the art will appreciate in light of this disclosure that many more than two PV ties 1006 (and corresponding bipolar arrays) may be coupled to the power conversion component 1008. It should also be recognized that although the control portion 1007 is depicted within the power conversion component 1008 (e.g., within the same housing), this is certainly not required, and the control portion 1007 may be realized as a separate unit that is coupled to the power conversion component 1008 (e.g., as a retrofit).

Figure 11:
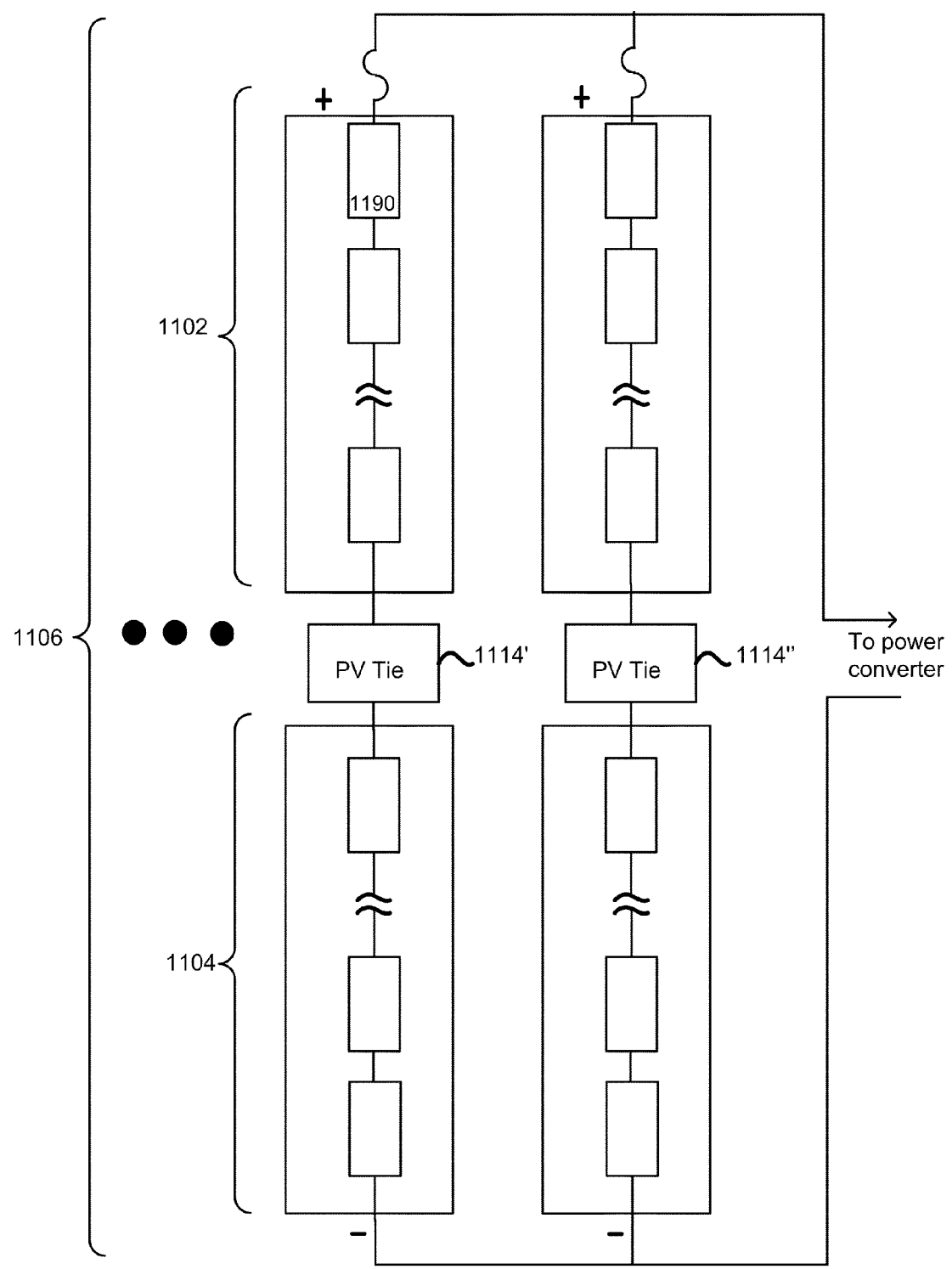
FIG. 11 depicts an arrangement of photovoltaic ties and photovoltaic strings according to an exemplary embodiment.

Referring next to FIG. 11, shown is an exemplary embodiment of one architectural layout in which photovoltaic ties 1114 are distributed so that there is a photovoltaic tie 1114 for every string in a bipolar array 1106. As shown, there may be several photovoltaic panels 1190 (e.g., 24V panels) in each string, and there may be several strings in each set 1102, 1104 of the array 1106. Each of the photovoltaic ties 1114 in this embodiment may be configured to operate as the photovoltaic ties previously described herein (e.g., in a wired or wireless manner).

Figure 12:
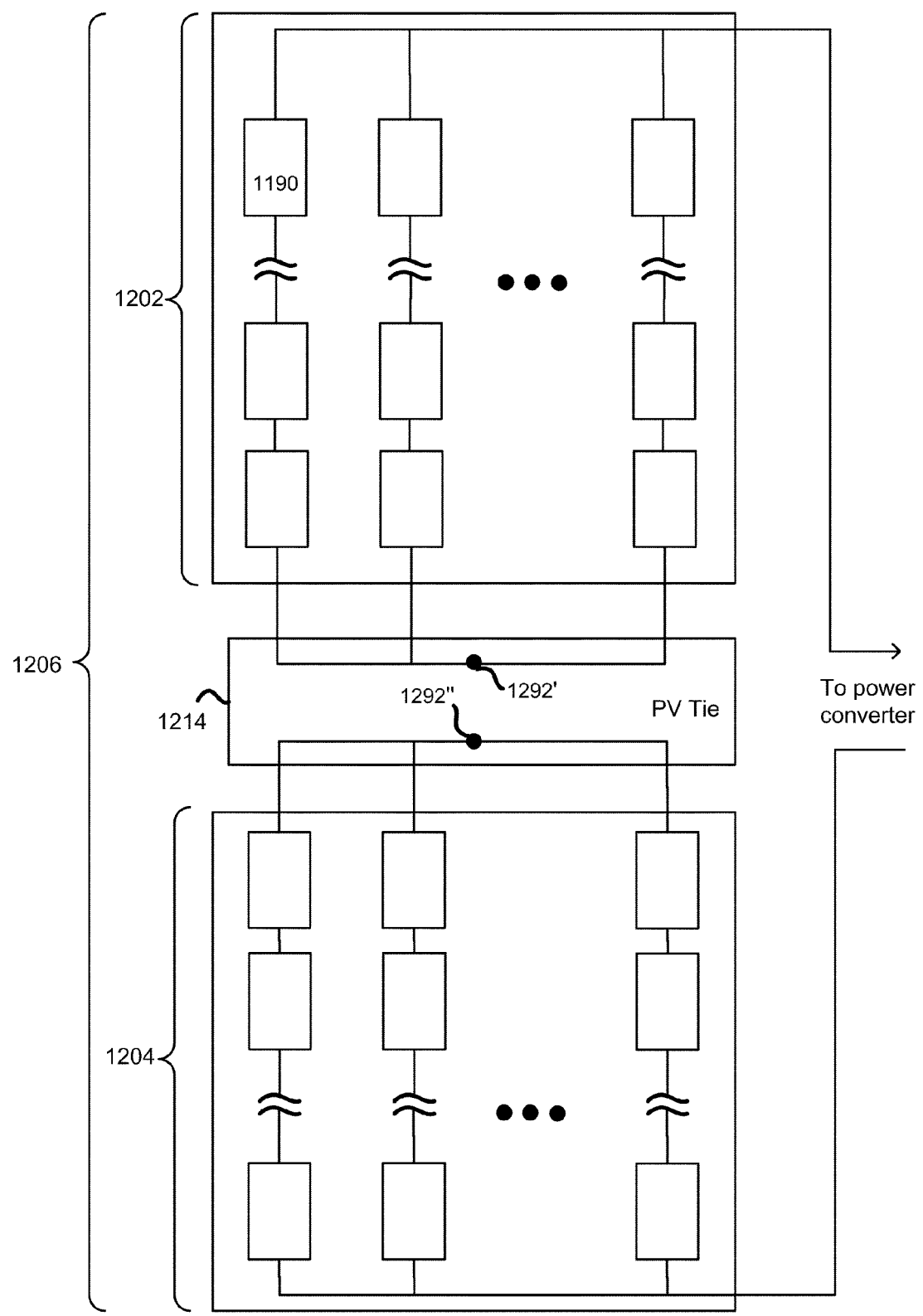
FIG. 12 depicts an arrangement of photovoltaic ties and photovoltaic strings according to an exemplary embodiment.

In other embodiments, such as shown with reference to FIG. 12, multiple strings of an array 1206 may be combined to couple in one photovoltaic tie 1214. As shown, several strings in each set 1202, 1204 of the array 1206 may be tied at nodes 1292', 1292" so that a single photovoltaic tie 1214 may couple the sets 1202, 1204 together. The nodes 1292', 1292" in this embodiment may couple, for example, to the main contactor 228 and operate as described with reference to FIG. 2.

In conclusion, the present invention provides, among other things, a system and method for coupling photovoltaic arrays with energy conversion and/or energy distribution equipment. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A photovoltaic energy conversion system comprising:
   a power conversion component configured to electrically coupled to both, a positive rail of each of a plurality of first photovoltaic arrays and a negative rail of each of a plurality of second photovoltaic arrays, the power conversion component adapted to convert a voltage between the positive rails of the first photovoltaic arrays and the negative rails of the second photovoltaic arrays from one form to another form, each of the plurality of first photovoltaic arrays configured to generate a direct current (DC) power, each of the plurality of first photovoltaic arrays is disposed above ground potential, and each of the plurality of the second photovoltaic arrays is configured to generate a direct current (DC) power, wherein each of the plurality of the second photovoltaic arrays is disposed below ground potential; and
   a plurality of photovoltaic ties, each of the plurality of photovoltaic ties is configured to couple a negative output of one of the plurality of first photovoltaic arrays and a positive output of a corresponding one of the plurality of the second photovoltaic arrays at a corresponding virtual ground and each of the plurality of photovoltaic ties is configured to decouple the one of the plurality of first photovoltaic arrays and the corresponding one of the plurality of the second photovoltaic arrays from the corresponding virtual ground so as to form a plurality of decouplable bipolar arrays, each of the plurality of photovoltaic ties is configured to couple the negative output of the one of the plurality of first photovoltaic arrays and the positive output of the corresponding one of the plurality of the second photovoltaic arrays to ground when the one of the plurality of first photovoltaic arrays and the corresponding one of the plurality of the second photovoltaic arrays are decoupled from the corresponding virtual ground.

2. The system of claim 1, including a control portion configured to wirelessly control the plurality of photovoltaic ties.

3. The system of claim 2, wherein each of the PV ties is configured to transmit status information and identifying information to the control portion, and the control portion is configured to utilize the status and identifying information to determine the status of each of the PV ties.

4. The system of claim 1, wherein the power conversion component is selected from the group of an inverter and a DC to DC power converter.

5. The system of claim 1, wherein the voltage between the positive rail of the first photovoltaic array and the negative rail of the second photovoltaic array exceeds 800 volts.

6. The system of claim 1, wherein an open-load voltage between the positive rail and a first neutral line does not exceed 600 volts.

7. The system of claim 1, wherein at least one of the plurality of photovoltaic ties includes a power component configured to receive power from one of the plurality of first photovoltaic arrays or one of the plurality of the second photovoltaic arrays.

8. A method for controlling a photovoltaic array comprising:
   coupling a negative line of a first photovoltaic array to a positive line of a second photovoltaic array in series at a virtual ground so as to place the first photovoltaic array above ground potential and the second photovoltaic array below ground potential;
   converting, remote from a location of the first and second photovoltaic arrays, power from the first and second arrays from one form to another form;
   decoupling the first photovoltaic array and the second photovoltaic array from the virtual ground;
   coupling the negative line of the first photovoltaic array and the positive line of the second photovoltaic array to ground when the first photovoltaic array and the second photovoltaic array are decoupled from the virtual ground; and
   wirelessly controlling the coupling of the neutral line of the first photovoltaic array to the neutral line of the second photovoltaic array.

9. The method of claim 8, wherein the coupling the negative line of the first photovoltaic array to the positive line of a second photovoltaic array includes obtaining power from one of the first photovoltaic and the second photovoltaic arrays and using the power to close a contactor disposed between the first and second photovoltaic arrays.

10. The method of claim 8, wherein converting includes converting the power from the first and second arrays to a higher DC voltage than the voltage of the power from the first and second arrays.

11. The method of claim 8, wherein converting includes converting power applied by no more than one conductor from the first photovoltaic array and one conductor from the second photovoltaic array.

12. An apparatus for coupling photovoltaic arrays comprising:

a first input adapted to couple to a negative line of a first photovoltaic array;

a second input adapted to couple to a positive line of a second photovoltaic array;

a contactor configured to switchably couple the negative line of the first photovoltaic array to the positive line of the second photovoltaic array at a virtual ground so the negative line of the first photovoltaic array and the positive line of the second photovoltaic array become neutral lines;

a first switch that couples the negative line of the first photovoltaic array to ground when the contactor is not coupling the negative line of the first photovoltaic array to the positive line of the second photovoltaic array;

a second switch that couples the positive line of the second photovoltaic array to ground when the contactor is not coupling the negative line of the first photovoltaic array to the positive line of the second photovoltaic array;

a wireless module adapted to receive the control signal from a controller;

a power component adapted to provide power to the contactor so that, responsive to the control signal, the contactor uses the power to switchably couple the negative line of the first photovoltaic array to the positive line of the second photovoltaic array.

13. The apparatus of claim 12, wherein the power component is configured to receive power from one of the first and second photovoltaic arrays and use the power from one of the first and second photovoltaic arrays to provide power to the contactor.

14. The apparatus of claim 12, wherein the power component is configured to receive power from an energy storage component and use the power from the energy storage component to provide power to the contactor.

15. The apparatus of claim 14, wherein the wireless module is configured to transmit tie information to the controller, the tie information indicating a status of the apparatus.

16. The apparatus of claim 15, wherein the tie information includes information indicative of whether the contactor is coupling the negative line of the first photovoltaic array to the positive line of the second photovoltaic array.

17. The apparatus of claim 15, wherein the tie information includes information indicative of a status of fuses, each of the fuses disposed to couple a corresponding one of the negative line of a first photovoltaic array and the positive line of a second photovoltaic array to ground when the contactor is open.

18. The apparatus of claim 15, wherein the wireless module is configured to transmit identifying information to the controller so as to identify the apparatus.

* * * * *